(12) United States Patent
Takazawa et al.

(10) Patent No.: US 10,642,037 B2
(45) Date of Patent: May 5, 2020

(54) HEAD-UP DISPLAY DEVICE

(71) Applicant: DENSO CORPORATION, Kariya, Aichi-pref. (JP)

(72) Inventors: Takashi Takazawa, Kariya (JP); Hiroshi Ando, Kariya (JP); Makoto Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 87 days.

(21) Appl. No.: 15/541,289

(22) PCT Filed: Jan. 15, 2016

(86) PCT No.: PCT/JP2016/000181
§ 371 (c)(1),
(2) Date: Jun. 30, 2017

(87) PCT Pub. No.: WO2016/117312
PCT Pub. Date: Jul. 28, 2016

(65) Prior Publication Data
US 2018/0017792 A1    Jan. 18, 2018

(30) Foreign Application Priority Data
Jan. 22, 2015  (JP) .................................. 2015-010291

(51) Int. Cl.
*G02B 27/01*      (2006.01)
*B60K 35/00*      (2006.01)
(Continued)

(52) U.S. Cl.
CPC .......... *G02B 27/0149* (2013.01); *B60K 35/00* (2013.01); *G02B 17/008* (2013.01);
(Continued)

(58) Field of Classification Search
CPC ................ G02B 27/01; G02B 27/0101; G02B 27/0149; G02B 2027/0136;
(Continued)

(56) References Cited

U.S. PATENT DOCUMENTS

| 5,646,639 A * | 7/1997 | Koie ...................... G02B 27/01 340/920 |
| 6,580,562 B2 * | 6/2003 | Aoki .................. G02B 27/0101 345/7 |

(Continued)

FOREIGN PATENT DOCUMENTS

| JP | H05003021 U | 1/1993 |
| JP | 2011123126 A | 6/2011 |

(Continued)

OTHER PUBLICATIONS

STIC search (Year: 2019).*

*Primary Examiner* — Travis S Fissel
(74) *Attorney, Agent, or Firm* — Harness, Dickey & Pierce, P.L.C.

(57) ABSTRACT

A head-up display device includes a housing, a projection unit projecting light representing an image, and an optical unit leading the light projected from the projection unit to a windshield of a vehicle. The optical unit includes a magnifying optical unit attached to the housing and reflecting the light toward the windshield, a screen attached to the housing and reflecting or transmitting the light toward the magnifying optical unit, and an incident angle changing unit changing an incident angle of the light that goes incident on the screen.

12 Claims, 13 Drawing Sheets

(51) Int. Cl.
*H04N 5/74* (2006.01)
*G03B 21/28* (2006.01)
*G03B 21/14* (2006.01)
*G02B 17/00* (2006.01)

(52) U.S. Cl.
CPC ......... *G02B 27/01* (2013.01); *G02B 27/0101* (2013.01); *G03B 21/14* (2013.01); *G03B 21/28* (2013.01); *H04N 5/74* (2013.01); *B60K 2370/155* (2019.05); *B60K 2370/1529* (2019.05); *B60K 2370/23* (2019.05); *B60K 2370/334* (2019.05); *B60K 2370/52* (2019.05); *B60K 2370/736* (2019.05); *B60K 2370/744* (2019.05); *G02B 2027/0145* (2013.01); *G02B 2027/0159* (2013.01)

(58) Field of Classification Search
CPC ...... G02B 2027/014; G02B 2027/0141; G02B 2027/0154
USPC ........... 359/618, 627, 629–631, 633, 13, 14; 340/905, 980; 348/148, 115, 142
See application file for complete search history.

(56) References Cited

U.S. PATENT DOCUMENTS

| | | | |
|---|---|---|---|
| 2003/0016451 A1* | 1/2003 | Aoki | G02B 27/01 359/633 |
| 2009/0160736 A1* | 6/2009 | Shikita | G02B 27/0101 345/7 |
| 2011/0134498 A1 | 6/2011 | Ohta et al. | |
| 2013/0063754 A1* | 3/2013 | Saisho | G02B 5/0257 358/1.13 |
| 2013/0094092 A1* | 4/2013 | Imahori | G02B 5/18 359/633 |
| 2014/0132189 A1* | 5/2014 | Kim | G03G 15/55 318/400.13 |
| 2014/0293246 A1* | 10/2014 | Takemoto | G02B 26/10 353/98 |
| 2016/0004076 A1* | 1/2016 | Matsubara | G02B 27/0101 345/7 |
| 2017/0115485 A1 | 4/2017 | Saito et al. | |

FOREIGN PATENT DOCUMENTS

| | | |
|---|---|---|
| JP | 201614861 A | 1/2016 |
| WO | WO-2015190311 A1 | 12/2015 |

* cited by examiner

HEAD-UP DISPLAY DEVICE

CROSS REFERENCE TO RELATED APPLICATIONS

This application is a U.S. National Phase Application under 35 U.S.C. 371 of International Application No. PCT/JP2016/000181 filed on Jan. 15, 2016 and published in Japanese as WO 2016/117312 A1 on Jul. 28, 2016. This application is based on and claims the benefit of priority from Japanese Patent Application No. 2015-010291 filed on Jan. 22, 2015. The entire disclosures of all of the above applications are incorporated herein by reference.

TECHNICAL FIELD

The present disclosure relates to a head-up display device.

BACKGROUND ART

A head-up display device in the related art displays a virtual image by projecting light representing an image onto a windshield of a vehicle and forming the image at an image forming position ahead of the windshield.

A position of an eyepoint (hereinafter, referred to as the eyepoint position) of an occupant varies with a physical size of the occupant. In order to use a head-up display device appropriately, it is necessary to adjust a position where light from the head-up display device goes incident on the windshield (hereinafter, referred to as the incident position) according to the eyepoint position.

The head-up display device described in Patent Literature 1 includes a concave mirror reflecting light to the windshield, and adjusts the incident position by rotating the concave mirror.

PRIOR ART LITERATURE

Patent Literature

Patent Literature 1: JP 2011-123126 A

SUMMARY OF INVENTION

According to the method described in Patent Literature 1, change of the incident position causes a change in position of a virtual image, and a position (depression angle) of a display image varies as well.

In view of the foregoing difficulties, it is an object of the present disclosure to provide a head-up display device which hardly causes a variance in position (depression angle) of a display image even when an incident position is adjusted according to a variance in eyepoint position.

According to an aspect of the present disclosure, a head-up display device includes a housing, a projection unit projecting light representing an image, and an optical unit leading the light projected from the projection unit to a windshield of a vehicle. The optical unit includes a magnifying optical unit attached to the housing and reflecting the light toward the windshield, a screen attached to the housing and reflecting or transmitting the light toward the magnifying optical unit, and an incident angle changing unit changing an incident angle of the light that goes incident on the screen.

According to the head-up display device of the present disclosure, a position of a virtual image hardly changes and hence a position (depression angle) of a display image hardly varies even when a position (incident position) where light goes incident on a windshield varies.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Embodiments of the present disclosure will be described according to the drawings.

(First Embodiment)

1. Configuration of Head-Up Display Device 1

Figure 1:
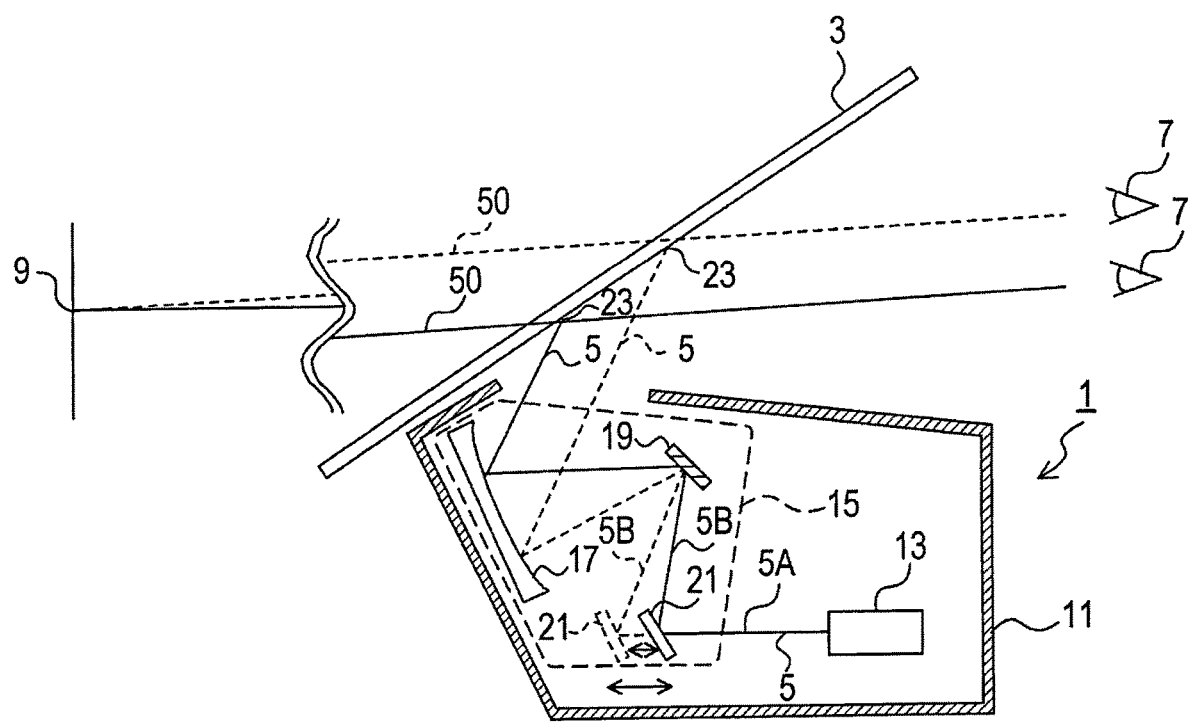
FIG. 1 is a sectional side view showing a configuration of a head-up display device according to one embodiment of the present disclosure.
Figure 2A:
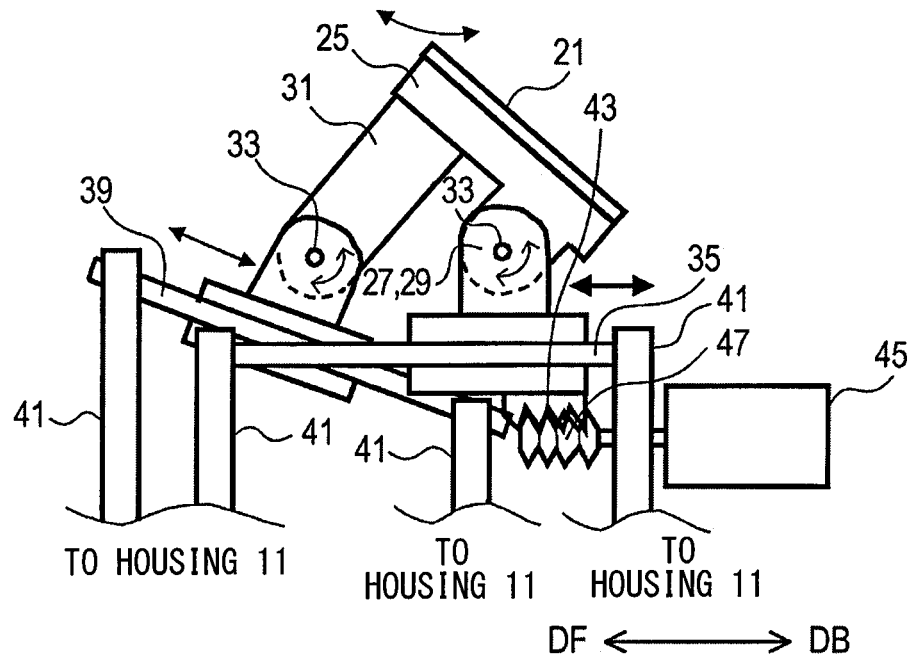
FIG. 2A is a side view showing a configuration to move a reflecting mirror.
Figure 2B:
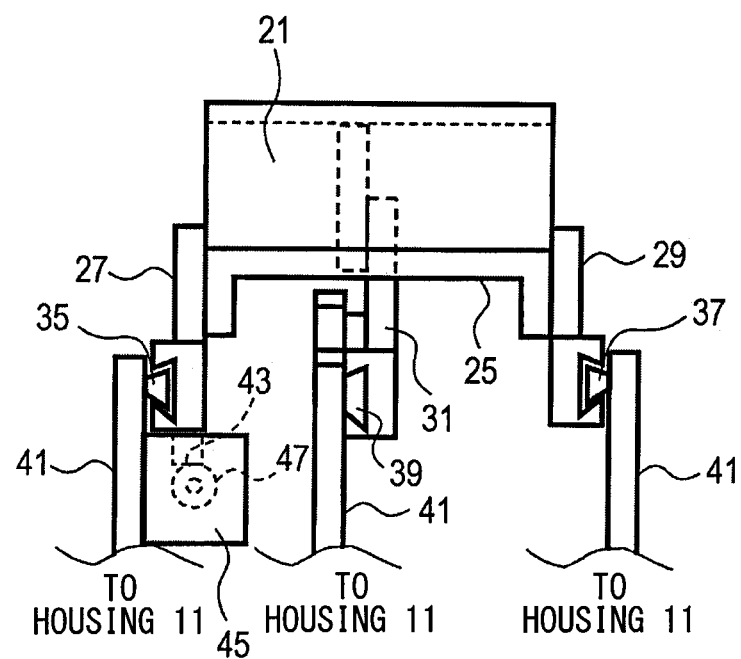
FIG. 2B is a front view showing the configuration to move the reflecting mirror.
Figure 3:
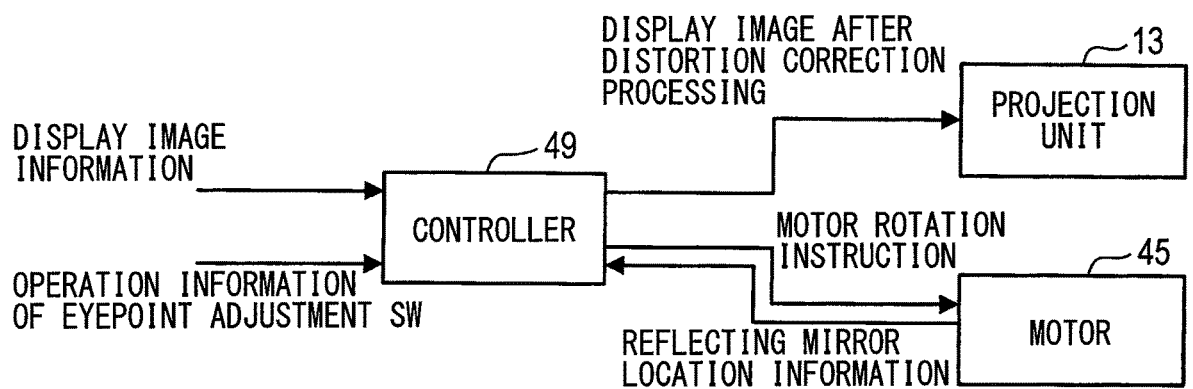
FIG. 3 is a block diagram showing an electrical configuration of the head-up display device.

A configuration of a head-up display device 1 will be described according to FIG. 1 through FIG. 3. The head-up display device 1 is an in-vehicle device equipped to a vehicle. As is shown in FIG. 1, the head-up display device 1 projects light 5 representing an image onto a windshield 3 of the vehicle. When viewed from an eyepoint position 7 of an occupant in the vehicle, the image represented by the light 5 is formed at an image forming position 9 ahead of the windshield 3 and displayed as a virtual image.

The head-up display device 1 includes a housing 11, a projection unit 13, and an optical unit 15. The housing 11 internally houses the projection unit 13 and the optical unit 15. The housing 11 is attached to the vehicle, and a location and a direction of the housing 11 with respect to the windshield 3 are set to be constant. The housing 11 has a predetermined shape.

The projection unit 13 projects light (laser beam) representing an image. The projection unit 13 draws an image on a screen 19 described below by scanning a laser beam. The projection unit 13 is attached to the housing 11, and a location and a direction of the projection unit 13 with respect to the housing 11 are constant.

The optical unit 15 includes a concave mirror 17, the screen 19, and a reflecting mirror 21. The concave mirror 17 is attached to the housing 11, and a location and a direction of the concave mirror 17 with respect to the housing 11 are constant. As has been described above, because the location and the direction of the housing 11 with respect to the windshield 3 are constant, a position and a location of the concave mirror 17 with respect to the windshield 3 are constant, too.

The screen 19 is attached to the housing 11, and a location and a direction of the screen with respect to the housing 11 are constant. As has been described above, because the location and the direction of the housing 11 with respect to the windshield 3 are constant, a location and a direction of the screen 19 with respect to the windshield 3 are constant, too. The screen 19 is a reflective screen and reflects the light 5. The screen 19 is provided by a micro-mirror array (MMA). A reflecting surface of the reflecting mirror 21 is a flat surface and has an infinite focal length.

The light 5 projected from the projection unit 13 goes into the optical unit 15, and the optical unit 15 leads the light to the windshield 3. In the optical unit 15, the light is sequentially reflected on the reflecting mirror 21, the screen 19, and the concave mirror 17. That is, the concave mirror 17 reflects the light 5 to the windshield 3, the screen 19 reflects the light 5 to the concave mirror 17, and the reflecting mirror 21 reflects the light 5 to the screen 19.

A location of the reflecting mirror 21 is configured to be changeable with respect to the screen 19. More specifically, the reflecting mirror 21 is movable parallel to light 5A that goes incident on the reflecting mirror 21. A transmitting direction of the light 5A and a moving direction of the reflecting mirror 21 are set along a front-rear direction of the vehicle.

The reflecting mirror 21 changes an angle with respect to the light 5A when moving parallel to the light 5A. The angle is changed to enable the reflecting mirror 21 to reflect the light 5 to the screen 19 within a movable range of the reflecting mirror 21. A mechanism to move and change an angle of the reflecting mirror 21 will be described below.

When the reflecting mirror 21 moves, an incident angle of light 5B that goes incident on the screen 19 varies. Consequently, on the windshield 3, an incident position 23 of the light 5, which is reflected on the screen 19 and the concave mirror 17, is varied. A direction in which the incident position 23 varies is a longitudinal direction (top-bottom direction) on the windshield 3.

The concave mirror 17 corresponds to an example of a magnifying optical unit. The reflecting mirror 21 together with a mechanism to move the reflecting mirror 21 corresponds to an example of an incident angle changing unit.

The mechanism to move and change an angle of the reflecting mirror 21 will now be described according to FIG. 2A and FIG. 2B. The reflecting mirror 21 is disposed on a bracket 25. The bracket 25 has a pair of outer leg portions 27 and 29 and a center leg portion 31 in a lower part. The outer leg portions 27 and 29 are provided to the bracket 25 close to a rear side DB of the vehicle while the center leg portion 31 is provided to the bracket 25 close to a front side DF of the vehicle. Each of the outer leg portions 27 and 29 and the center leg portion 31 is bendable at a corresponding joint portion 33.

The outer leg portions 27 and 29 are attached, respectively, to outer guide rails 35 and 37 in a slidable manner. The center leg portion 31 is attached to a center guide rail 39 in a slidable manner. The outer guide rails 35 and 37 and the center guide rail 39 extend in the front-rear direction of the vehicle. The outer guide rails 35 and 37 are parallel to the light 5. Meanwhile, the center guide rail 39 is inclined so that one end close to the front side DF of the vehicle is higher than the other end close to the rear side DB of the vehicle. Each of the outer guide rails 35 and 37 and the center guide rail 39 is attached to the housing 11 with a corresponding support member 41.

The head-up display device 1 includes a motor 45 as a drive source of the bracket 25. The outer leg portion 27 includes a gear 43 at a lower end. The gear 43 meshes with a gear 47 attached to the motor 45. Hence, when the motor 45 rotates, a drive force of the motor 45 is transmitted to the bracket 25 via the gear 43 and the gear 47. The bracket 25 thus is capable of sliding in the front-rear direction of the vehicle.

As has been described above, the outer leg portions 27 and 29 of the bracket 25 on the rear side DB are attached to the horizontal outer guide rails 35 and 37, respectively. The center leg portion 31 of the bracket 25 on the front side DF is attached to the center guide rail 39 which inclines to be higher on the front side DF of the vehicle than on the rear side DB of the vehicle. Accordingly, when the bracket 25 slides in the front-rear direction of the vehicle, angles of the bracket 25 and the reflecting mirror 21 vary gradually.

More specifically, a front portion of the reflecting mirror 21 close to the front side DF of the vehicle ascends and a rear portion of the reflecting mirror 21 close to the rear side DB of the vehicle descends when the bracket 25 slides further in a direction toward the front side DF of the vehicle. Conversely, the front portion of the reflecting mirror 21 close to the front side DF descends and the rear portion of the reflecting mirror 21 close to the rear side DB ascends when the bracket 25 slides further in a direction toward the rear side DB of the vehicle.

An electrical configuration of the head-up display device 1 will now be described according to FIG. 3. The head-up display device 1 includes a controller 49, the projection unit 13, and the motor 45. The controller 49 is a known computer including a CPU, a RAM, a ROM, and so on. The controller 49 performs processing described below by running a program pre-stored in the ROM.

The controller 49 acquires display image information from another device equipped to the vehicle. The display image information is information representing an image to be displayed by the head-up display device 1. The controller 49 performs distortion correction processing described below to the display image information, and controls the projection unit 13 to project light representing a display image generated based on the display image information to which the distortion correction processing is performed.

The controller 49 also acquires operation information from an eyepoint adjustment switch (SW) provided inside a compartment of the vehicle. The operation information is information that instructs a movement of the incident position 23 (see FIG. 1) in either an upward direction or a downward direction. That is, the operation information includes information instructing a movement of the incident position 23 in an upward direction and information instructing a movement of the incident position 23 in a downward direction.

The controller 49 outputs a motor rotation instruction to the motor 45 according to the operation information. In response to the motor rotation instruction, the motor 45 rotates by a quantity in a direction as specified by the motor rotation instruction to change a location and an angle of the reflecting mirror 21. Consequently, the incident position 23 is moved.

It should be noted, however, that because a movable range of the reflecting mirror 21 is limited, once the reflecting mirror 21 has fully moved to a limit in the specified direction, even when the controller 49 acquires operation information instructing a further movement of the reflecting mirror 21 in the specified direction, the controller 49 cannot control the reflecting mirror 21 to move in response to the operation information.

The controller 49 also acquires a rotation state of the motor 45 (that is, location information of the reflecting mirror 21) from the motor 45. The location information of the reflecting mirror 21 is used in the distortion correction processing described below. The controller 49 corresponds to an example of a location acquisition unit and a correction unit.

2. Distortion Correction Processing Performed by Head-Up Display Device 1

Figure 4:
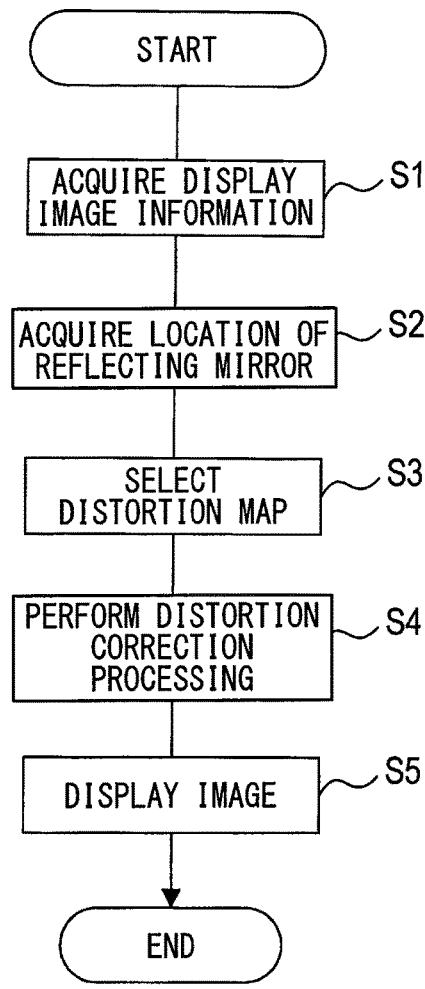
FIG. 4 is a flowchart showing a distortion correction processing performed by the head-up display device.

The distortion correction processing performed by the head-up display device 1 (in particular, performed by the controller 49) will be described according to FIG. 4. The processing is performed when the display image information is outputted to the controller 49.

In Step S1, the display image information is acquired.

In Step S2, the location information of the reflecting mirror 21 is acquired from the motor 45.

In Step S3, a distortion map corresponding to the location information of the reflecting mirror 21 acquired in Step S2 is selected. The controller 49 has pre-stored multiple distortion maps, and each piece of the location information of the reflecting mirror 21 is correlated with corresponding one of the multiple distortion maps.

In Step S4, the distortion correction processing is performed by using the distortion map selected in Step S3. The distortion correction processing referred to herein is as follows. When the location of the reflecting mirror 21 varies, an optical path length of the light 5 from the projection unit 13 to the screen 19 varies. When the optical path length varies, distortion occurs in an image on the screen 19. The distortion correction processing is carried out to correct a shape of the image represented by the display image information to reduce the distortion of the image displayed on the screen 19. Each of the distortion maps defines a content of the distortion correction processing.

In Step S5, the projection unit 13 is controlled to project light representing the display image which is corrected by the distortion correction processing.

3. Effect of Head-Up Display Device 1

(1A) The head-up display device 1 includes the concave mirror 17 attached to the housing 11 and the screen 19 attached to the housing 11. The head-up display device 1 changes the incident position 23 by moving the reflecting mirror 21, and thereby changing an incident angle of the light 5 that goes incident on the screen 19. When configured as above, even when the incident position 23 varies, a notable change of an incident angle of the light 5 with respect to the windshield 3 can be suppressed (see FIG. 1). Consequently, even when the incident position 23 varies, a change in the depression angle of a straight line 50 which extends from the eyepoint position 7 to the image forming position 9 passing the incident position 23 can be suppressed, and hence a change in position of a display image (virtual image) can be suppressed.

In the case of a method, by which the incident position 23 is changed by rotating the concave mirror 17 as is disclosed in Patent Literature 1, an incident angle of the light 5 with respect to the windshield 3 varies noticeably when the incident position 23 is changed. Consequently, when the incident position 23 varies, the straight line 50 extending from the eyepoint position 7 to the image forming position 9 passing the incident position 23 varies noticeably, and hence a position of a display image (virtual image) varies noticeably.

(1B) The head-up display device 1 includes the reflecting mirror 21 capable of changing a location with respect to the screen 19. Hence, an incident angle of the light 5 that goes incident on the screen 19 can be changed readily.

(1C) The head-up display device 1 corrects distortion of an image represented by the light 5 projected from the projection unit 13 according to a location of the reflecting mirror 21. Hence, an image with little distortion can be displayed.

(1D) The reflecting mirror 21 is configured to move parallel to the light 5A. Hence, the mechanism to move the reflecting mirror 21 can be configured in a simple manner.

(1E) The head-up display device 1 includes the reflective screen 19. Hence, the head-up display device 1 can be configured in a simple manner.

(1F) The screen 19 is provided by a micro-mirror array (MMA). Hence, reflectance of the screen 19 can be increased. In addition, because light can be diffused only in a necessary direction, use efficiency of light can be increased.

(Second Embodiment)

1. Configuration of Head-Up Display Device 101

Figure 5:
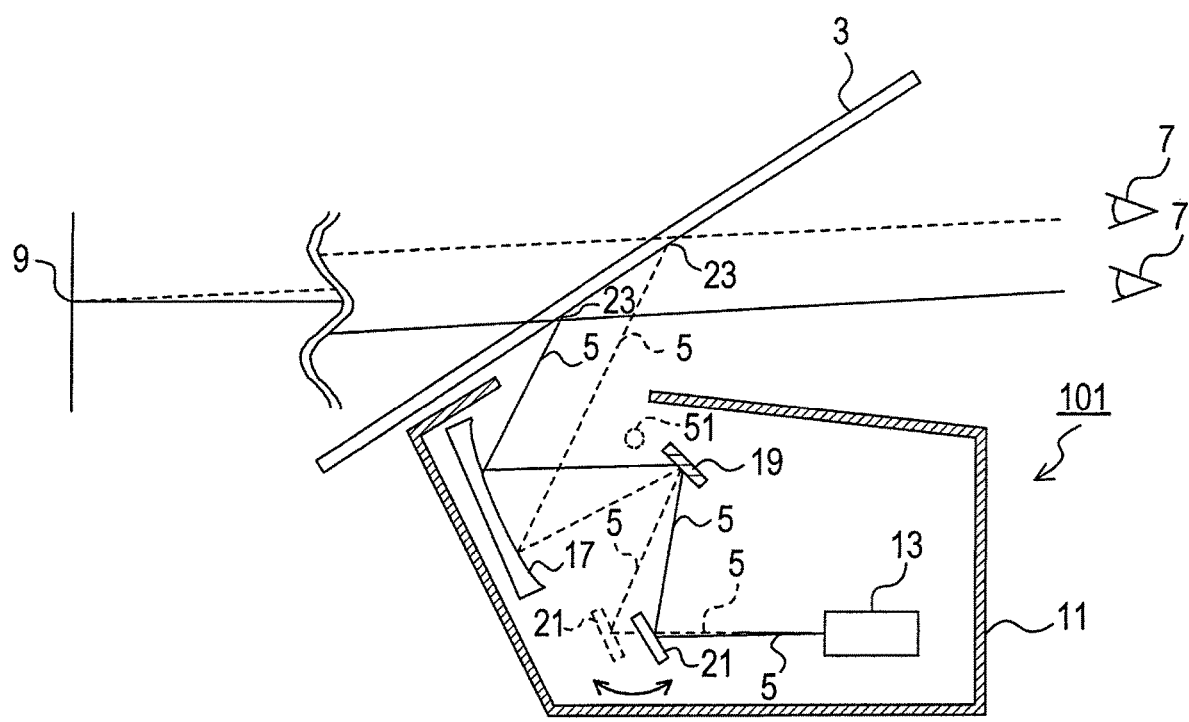
FIG. 5 is a sectional side view showing a configuration of a head-up display device.
Figure 6A:
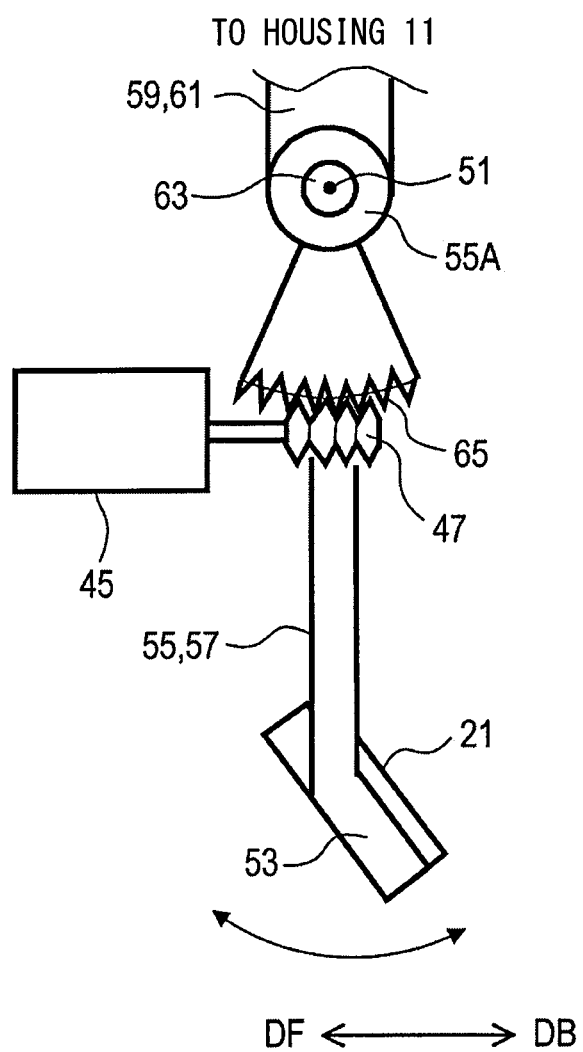
FIG. 6A is a side view showing a configuration to move a reflecting mirror.
Figure 6B:
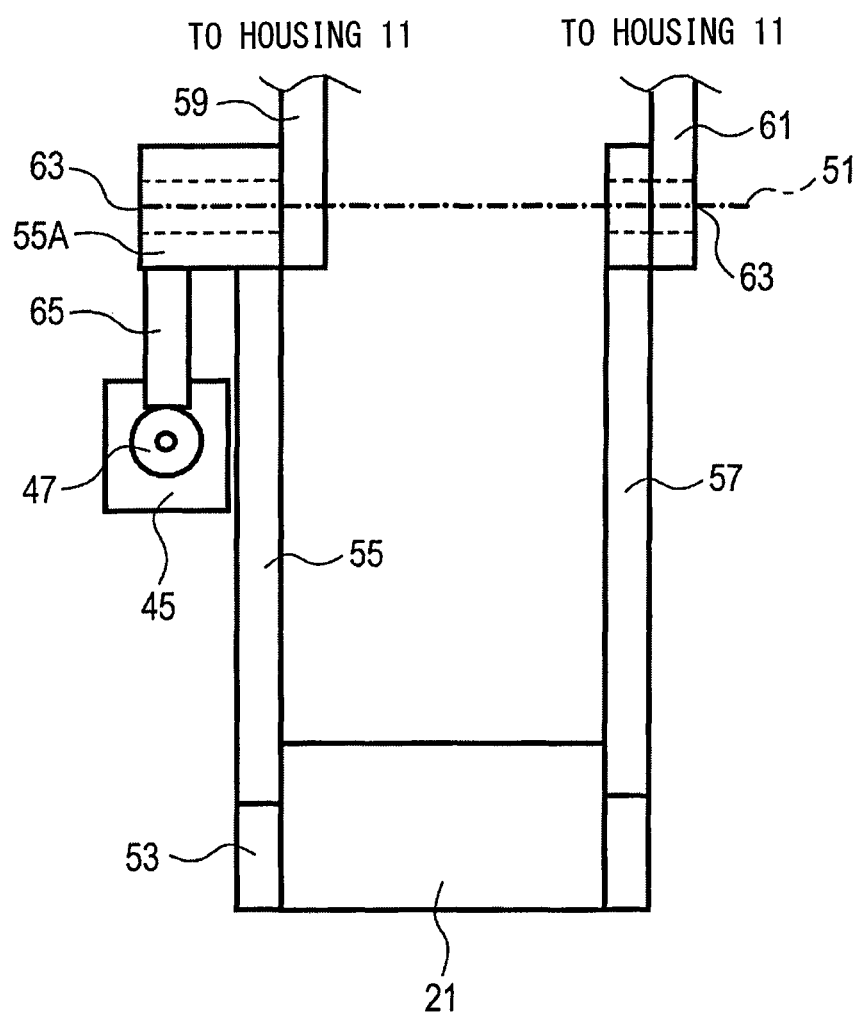
FIG. 6B is a front view showing the configuration to move the reflecting mirror.

A configuration of a head-up display device 101 will be described according to FIG. 5, FIG. 6A, and FIG. 6B. As is shown in FIG. 5, the configuration of the head-up display device 101 is basically same as the configuration of the head-up display device 1 of the first embodiment. The following will mainly describe a difference from the first embodiment.

In the present embodiment, a reflecting mirror 21 is movable in an arc orbit which has a rotation center 51 disposed remote from the reflecting mirror 21. When the reflecting mirror 21 moves in the arc orbit, an incident angle of light 5 that goes incident on a screen 19 varies. A projection unit 13 adjusts a projection direction of the light 5, and projects the light 5 onto the reflecting mirror 21 for each location of the reflecting mirror 21 on the arc orbit.

A configuration to move the reflecting mirror 21 in the arc orbit will now be described according to FIG. 6A and FIG. 6B. The reflecting mirror 21 is attached to a bracket 53. The bracket 53 includes a pair of arm portions 55 and 57 both extending upward. The arm portions 55 and 57 are attached to respective support members 59 and 61 via respective bearings 63 in a rotatable manner. An axial direction of the bearings 63 is parallel to a width direction of a vehicle. The respective support members 59 and 61 are attached to a housing 11. Location of each bearing 63 corresponds to the rotation center 51 described above.

The head-up display device 101 includes a motor 45 as a drive source of the bracket 53. The arm portion 55 includes a gear 65. The gear is disposed on a lower side of an axial support portion 55A, which is axially supported on the corresponding bearing 63. The gear 65 meshes with a gear 47 attached to the motor 45. Hence, when the motor 45 rotates, a drive force of the motor 45 is transmitted to the bracket 53 via the gear 47 and the gear 65. The bracket 53 thus rotates about the rotation center 51 and the reflecting mirror 21 moves in an arc orbit about the rotation center 51. An angle of the reflecting mirror 21 with respect to the light 5 varies when the reflecting mirror 21 moves in the arc orbit.

2. Distortion Correction Processing Performed by Head-Up Display Device 101

The head-up display device 101 performs distortion correction processing in a same manner as in the first embodiment.

3. Effect of Head-Up Display Device 101

According to the second embodiment described above, the following effect can be achieved in addition to the effects (1A) through (1C), 1(E), and (1F) of the first embodiment.

(2A) The reflecting mirror 21 is movable in an arc orbit about the rotation center 51 as described above. Hence, an angle of the reflecting mirror 21 can be changed with a simple configuration during a movement of the reflecting mirror 21.

(Third Embodiment)

1. Configuration of Head-Up Display Device 201

Figure 7:
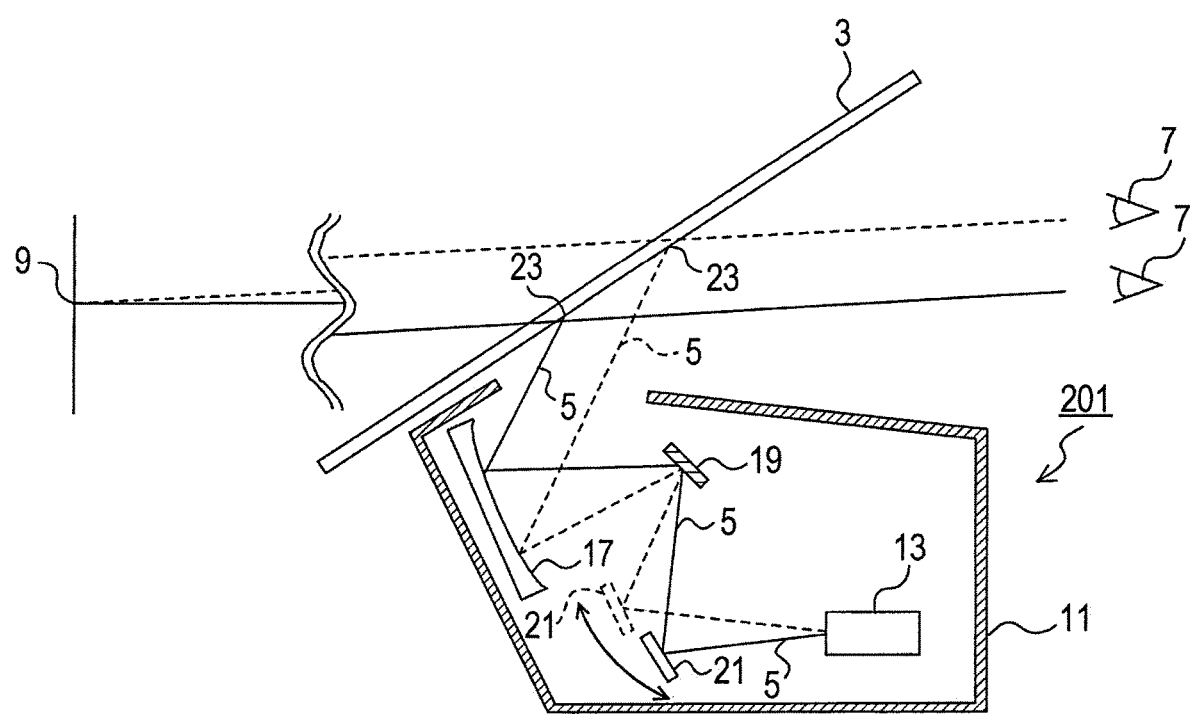
FIG. 7 is a sectional side view showing a configuration of a head-up display device.
Figure 8A:
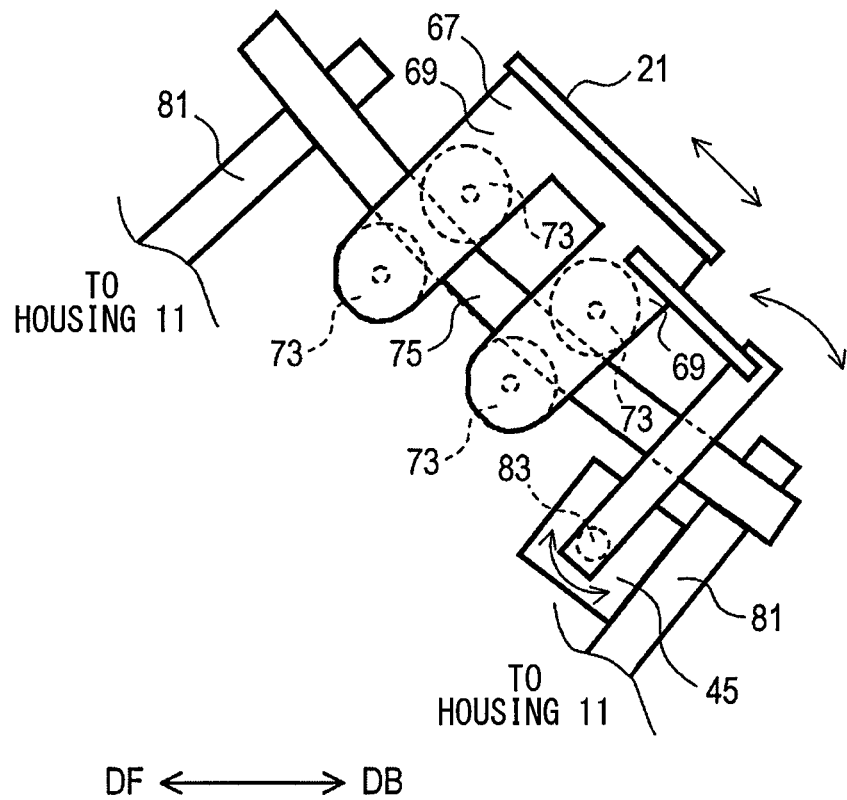
FIG. 8A is a side view showing a configuration to move a reflecting mirror.
Figure 8B:
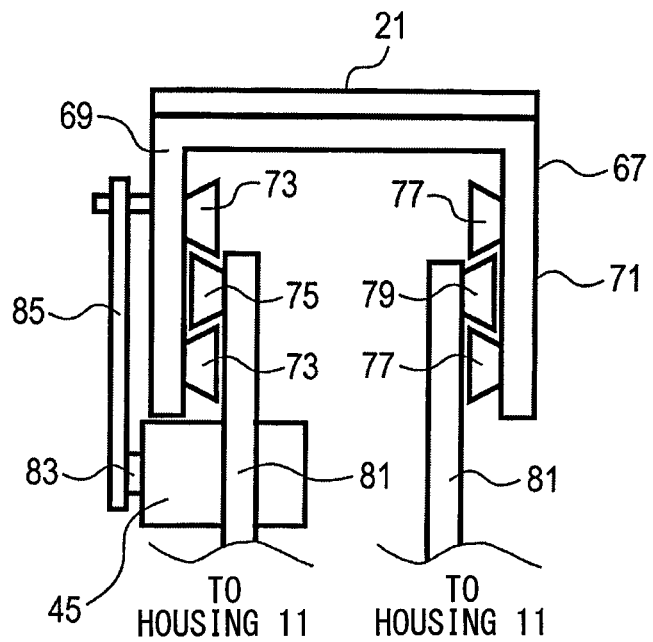
FIG. 8B is a front view showing the configuration to move the reflecting mirror.

A configuration of a head-up display device 201 will be described according to FIG. 7, FIG. 8A, and FIG. 8B. As is shown in FIG. 7, the configuration of the head-up display device 201 is basically same as the configuration of the head-up display device 1 of the first embodiment. The following will mainly describe a difference from the first embodiment.

In the present embodiment, a reflecting mirror 21 is movable in an elliptical orbit (for example, an elliptical orbit maintaining a constant length of light path from a projection unit 13 to a screen 19 constant) with foci at the projection unit 13 and the screen 19. An incident angle of light 5 that goes incident on the screen 19 varies when the reflecting mirror 21 moves in the elliptical orbit. The projection unit 13 adjusts a projection direction of the light 5, and projects the light 5 onto the reflecting mirror 21 for each location of the reflecting mirror 21 on the elliptical orbit.

A configuration to move the reflecting mirror 21 in an elliptical orbit will be described according to FIG. 8A and FIG. 8B. The reflecting mirror 21 is attached to a bracket 67. The bracket 67 includes two leg portions 69 on one side in a width direction of a vehicle (a direction perpendicular to a sheet surface of FIG. 8A, and a right-left direction in FIG. 8B), and further includes two leg portions 71 on opposite side in the width direction of the vehicle. The leg portions 69 and 71 are attached to a lower part of the bracket 67. The two leg portions 69 are arranged in a front-rear direction of the vehicle. The two leg portions 71 are also arranged in the front-rear direction of the vehicle.

Each of the two leg portions 69 includes a pair of guide rollers 73, and a guide rail 75 is sandwiched by the upper guide roller 73 and the lower guide roller 73. The leg portions 69 are thus slidable along the guide rail 75. Likewise, each of the two leg portions 71 includes a pair of guide rollers 77, and a guide rail 79 is sandwiched by the upper guide roller 77 and the lower guide roller 77. The leg portions 71 are thus slidable along the guide rail 79.

Each of the guide rails 75 and 79 extends in the front-rear direction of the vehicle, and is disposed at a predetermined interval from one another in the front-rear direction of the vehicle. Each of the guide rails 75 and 79 is attached to a housing 11 with a support member 81. Each of the guide rails 75 and 79 has an elliptical orbit shape with foci at the projection unit 13 and the screen 19.

The head-up display device 201 includes a motor 45 as a drive source of the bracket 67. A rotation shaft 83 of the motor 45 is coupled to an upper part of the bracket 67 via a link 85. Hence, when the motor 45 rotates, a drive force allows the bracket 67 and the reflecting mirror 21 to slide along the guide rails 75 and 79. As has been described above, each of the guide rails 75 and 79 has an elliptical orbit shape with foci at the projection unit 13 and the screen 19. Thus, the reflecting mirror 21 can move in an elliptical orbit.

2. Distortion Correction Processing Performed by Head-Up Display Device 201

The head-up display device 201 performs distortion correction processing in a same manner as in the first embodiment.

3. Effect of Head-Up Display Device 201

According to the third embodiment described above, the following effect can be achieved in addition to the effects (1A) through (1C), (1E), and (1F) achieved in the first embodiment.

(3A) The reflecting mirror 21 moves in an elliptical orbit with the foci at the projection unit 13 and the screen 19. Accordingly, even when the reflecting mirror 21 moves, a length of light path from the projection unit 13 to the screen 19 is maintained constant. Hence, a blurring of an image on the screen 19 can be suppressed. In addition, it is no longer essentially necessary to adjust a focal point of the projection unit 13.

(Fourth Embodiment)

1. Configuration of Head-Up Display Device 301

Figure 9:
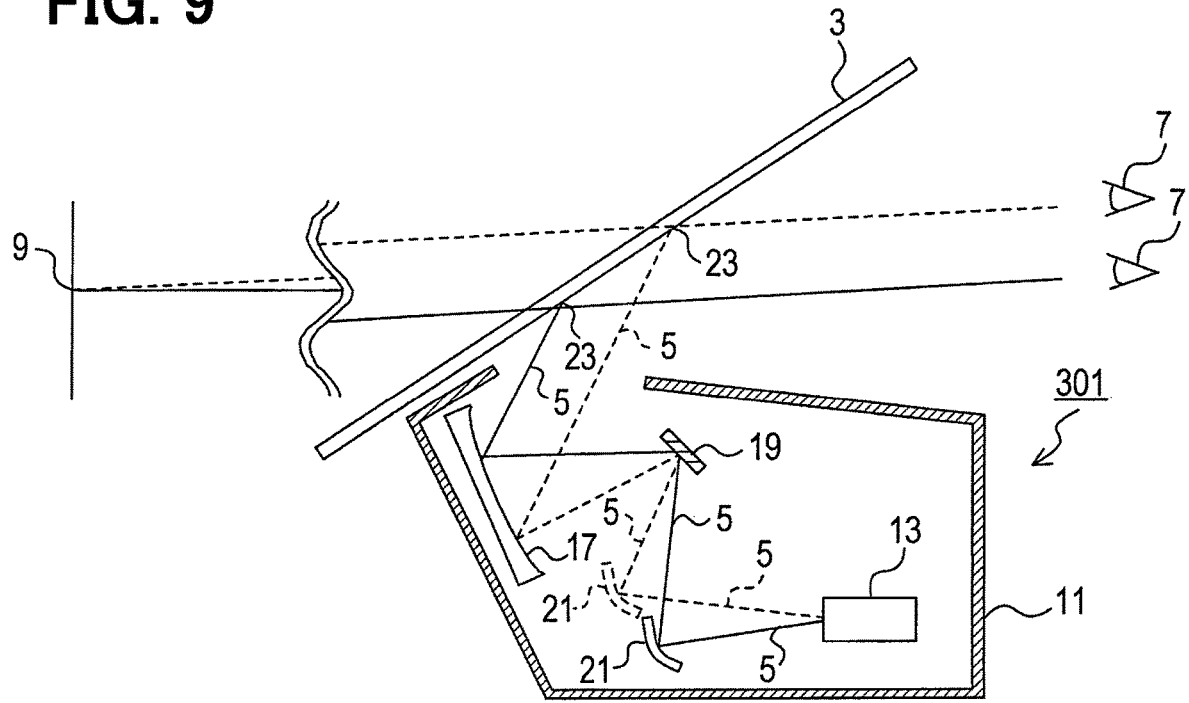
FIG. 9 is a sectional side view showing a configuration of the head-up display device.

A configuration of a head-up display device 301 will be described according to FIG. 9. As is shown in FIG. 9, the configuration of the head-up display device 301 is basically same as the configuration of the head-up display device 201 of the third embodiment. The following will mainly describe a difference from the third embodiment.

In the present embodiment, a reflecting mirror 21 has a finite focal length. The reflecting mirror 21 can be, for example, a concave mirror or a convex mirror.

2. Distortion Correction Processing Performed by Head-Up Display Device 301

The head-up display device 301 performs distortion correction processing in a same manner as in the third embodiment.

3. Effect of Head-Up Display Device 301

According to the fourth embodiment described above, the following effect can be achieved in addition to the effects (1A) through (1C), (1E), (1F), and (3A) achieved in the third embodiment.

(4A) The reflecting mirror 21 has a finite focal length. Hence, an image displayed on a screen 19 can be magnified or diminished. In addition, a layout of the reflecting mirror 21, the screen 19, and so on can be set in a flexible manner.

(Fifth Embodiment)

1. Configuration of Head-Up Display Device 401

Figure 10:
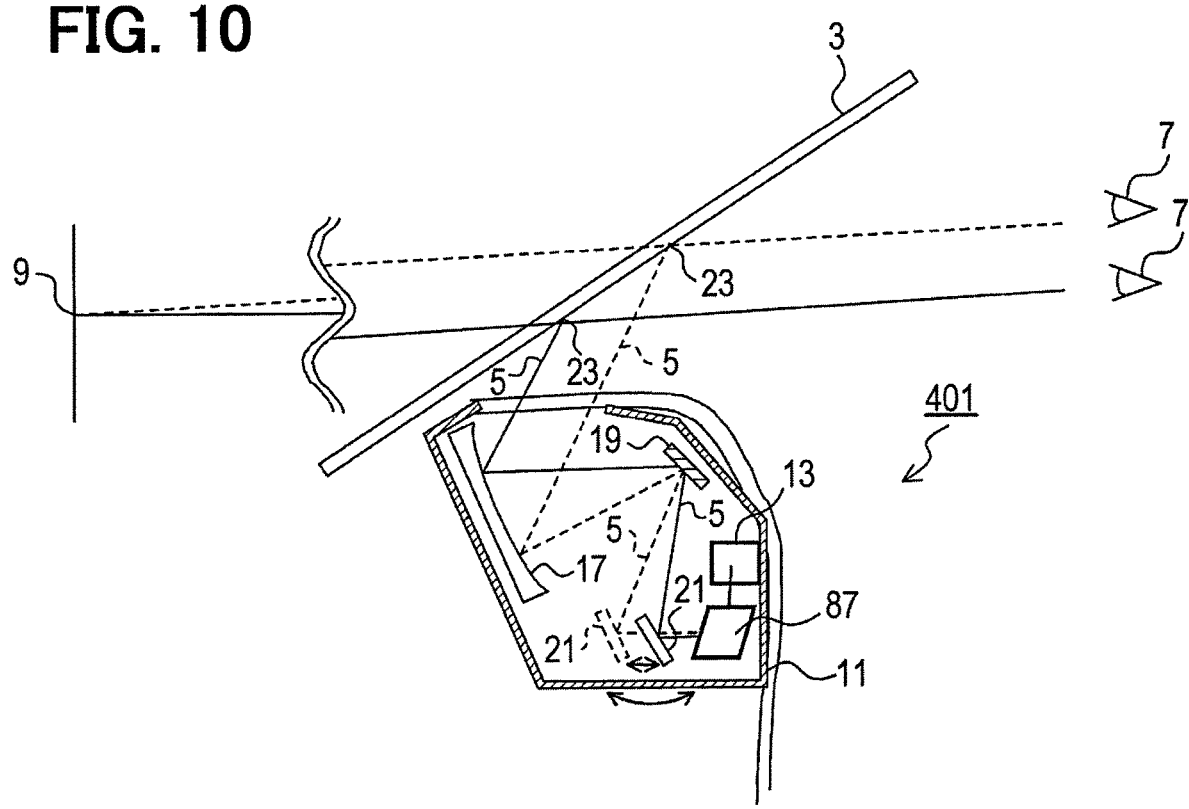
FIG. 10 is a sectional side view showing a configuration of a head-up display device.

A configuration of a head-up display device 401 will be described according to FIG. 10. As is shown in FIG. 10, the configuration of the head-up display device 401 is basically same as the configuration of the head-up display device 1 of the first embodiment. The following will mainly describe a difference from the first embodiment.

The head-up display device 401 includes a second reflecting mirror 87 which reflects light 5 projected from a projection unit 13 to a reflecting mirror 21. Hence, the light 5 projected from the projection unit 13 is reflected on the second reflecting mirror 87 first and then reaches the reflecting mirror 21. The second reflecting mirror 87 is attached to a housing 11. The second reflecting mirror 87 corresponds to an example of a reflection unit.

2. Distortion Correction Processing Performed by Head-Up Display Device 401

The head-up display device 401 performs distortion correction processing in a same manner as in the first embodiment.

3. Effect of Head-Up Display Device 401

According to the fifth embodiment described above, the following effect can be achieved in addition to the effects (1A) through (1C), (1E), and (1F) achieved in the first embodiment.

(5A) According to the present embodiment, a light path of the light 5 is bent by the second reflecting mirror 87. Thus, compact head-up display device 401 can be provided according to the present embodiment.

(Sixth Embodiment)

1. Configuration of Head-Up Display Device 501

Figure 11:
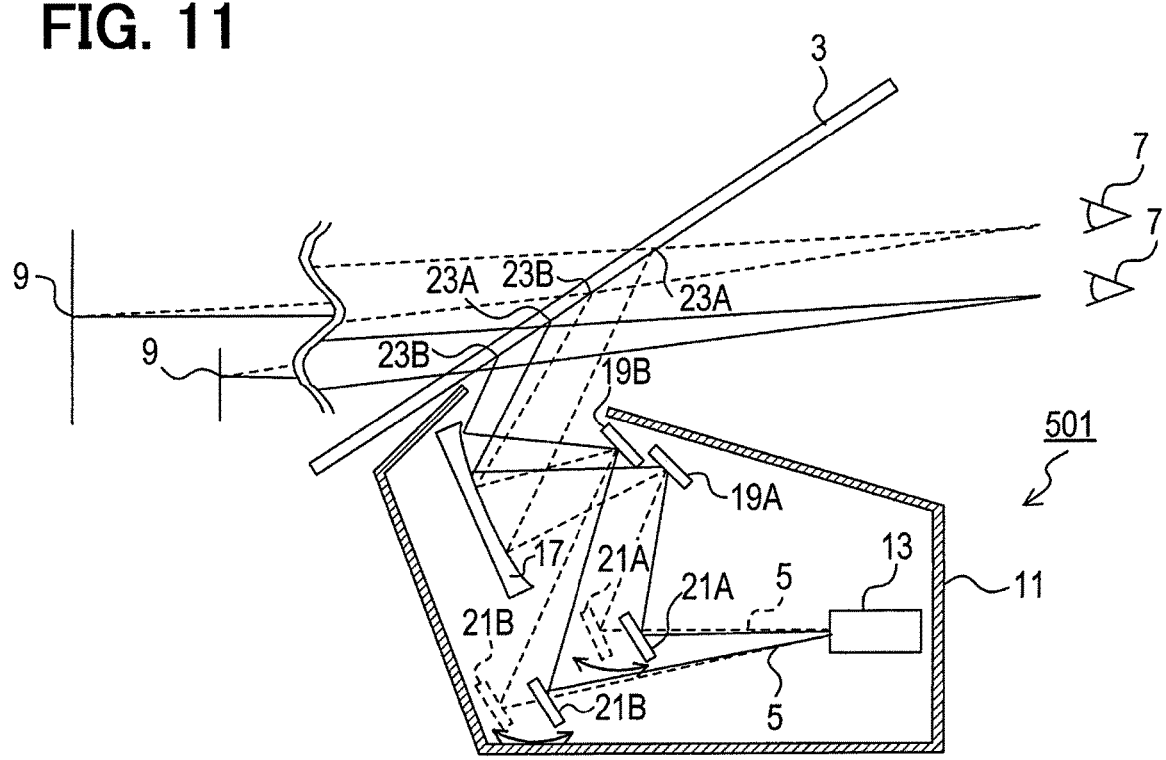
FIG. 11 is a sectional side view showing a configuration of a head-up display device.

A configuration of a head-up display device 501 will be described according to FIG. 11. As is shown in FIG. 11, the configuration of the head-up display device 501 is basically same as the configuration of the head-up display device 101 of the second embodiment. The following will mainly describe a difference from the second embodiment.

The head-up display device 501 includes two optical sets each of which having a screen and a reflecting mirror. One set includes a screen 19A and a reflecting mirror 21A. The other set includes a screen 19B and a reflecting mirror 21B.

In a case where an image is displayed by one optical set including the screen 19A and the reflecting mirror 21A, an incident position 23A is present on an upper side of a windshield 3. Hence, a virtual image is displayed on an upper side. Meanwhile, in a case were an image is displayed by the other optical set including the screen 19B and the reflecting mirror 21B, an incident position 23B is present on a lower side of the windshield 3. Hence, a virtual image is displayed on a lower side. In short, a direction to lead light 5 to the windshield 3 differs between the two optical sets.

A projection unit 13 is capable of projecting the light 5 to either reflecting mirror 21A or 21B by switching projection direction of the light 5.

2. Distortion Correction Processing Performed by Head-Up Display Device 501

The head-up display device 501 performs distortion correction processing in a same manner as in the second embodiment. The distortion correction processing is performed separately for one optical set including the screen 19A and the reflecting mirror 21A and for the other optical set including the screen 19B and the reflecting mirror 21B.

3. Effect of Head-Up Display Device 501

According to the sixth embodiment described above, the following effect can be achieved in addition to the effects (1A) through (1C), (1E), (1F), and (2A) achieved in the second embodiment.

(6A) The head-up display device 501 is capable of switching display direction (display distance) of a virtual image by selectively using the two optical sets described above.

(Seventh Embodiment)

1. Configuration of Head-Up Display Device 601

Figure 12:
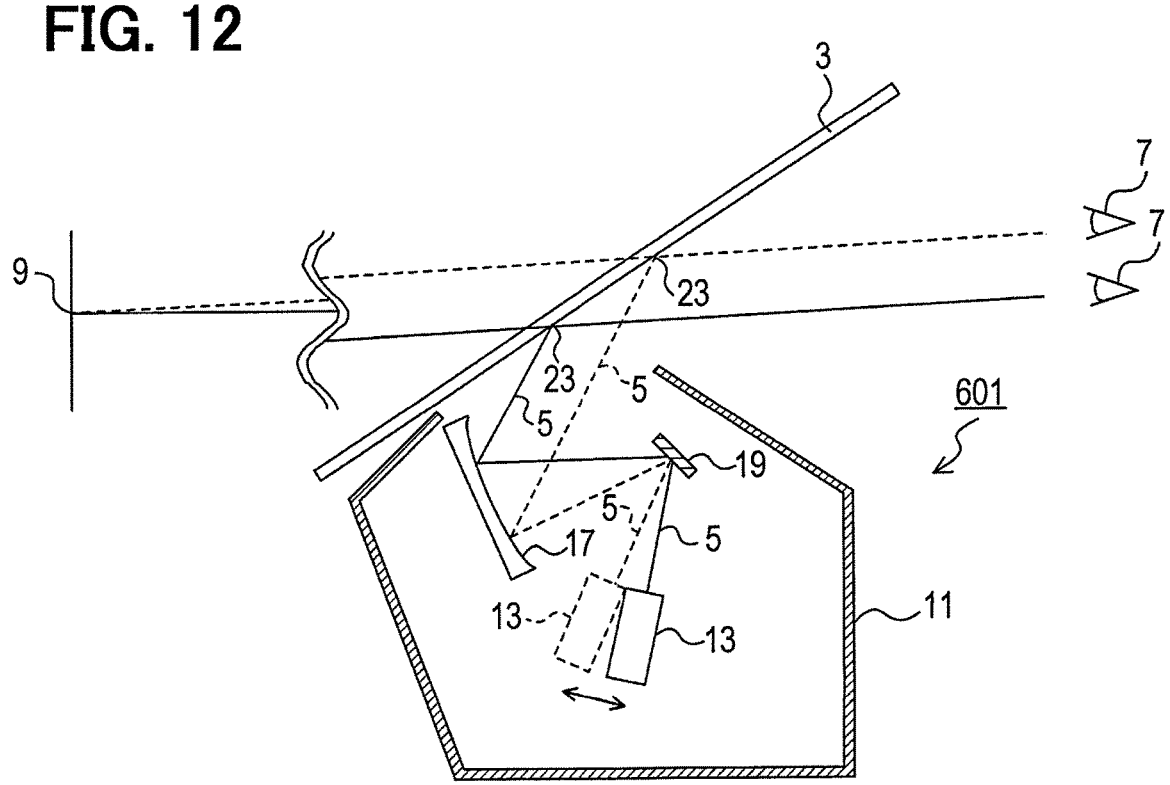
FIG. 12 is a sectional side view showing a configuration of a head-up display device.
Figure 13A:
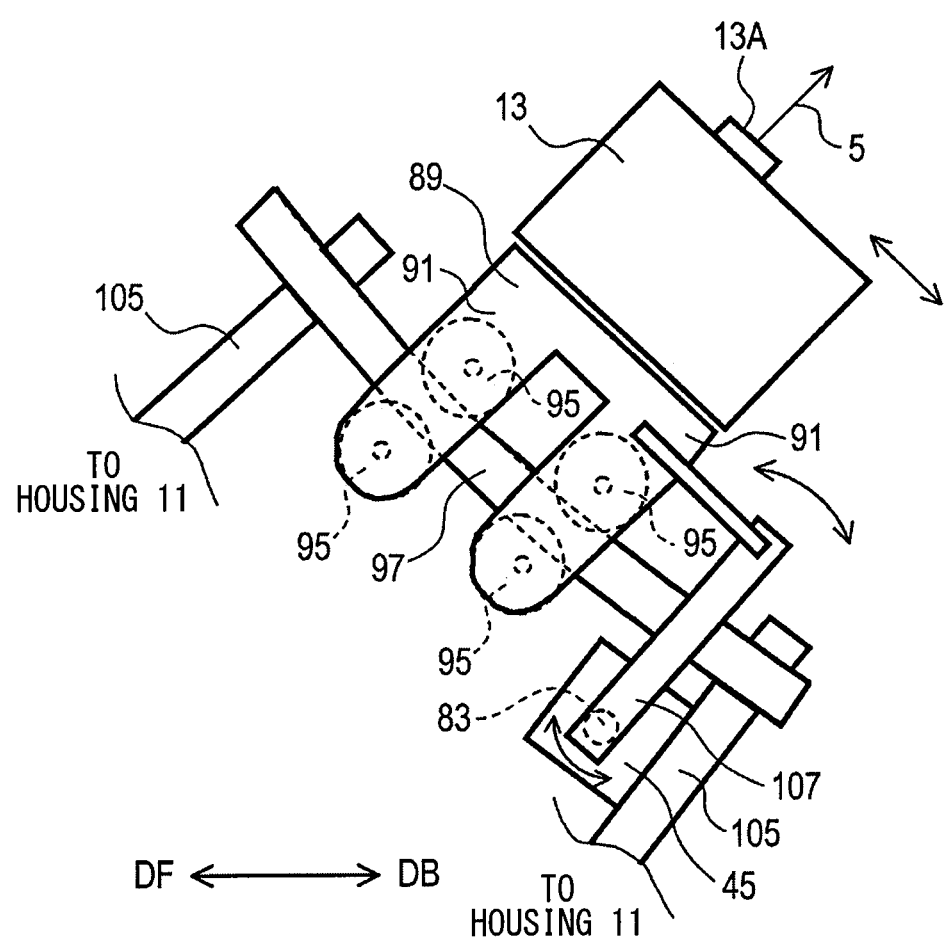
FIG. 13A is a side view showing a configuration to move a projection unit.
Figure 13B:
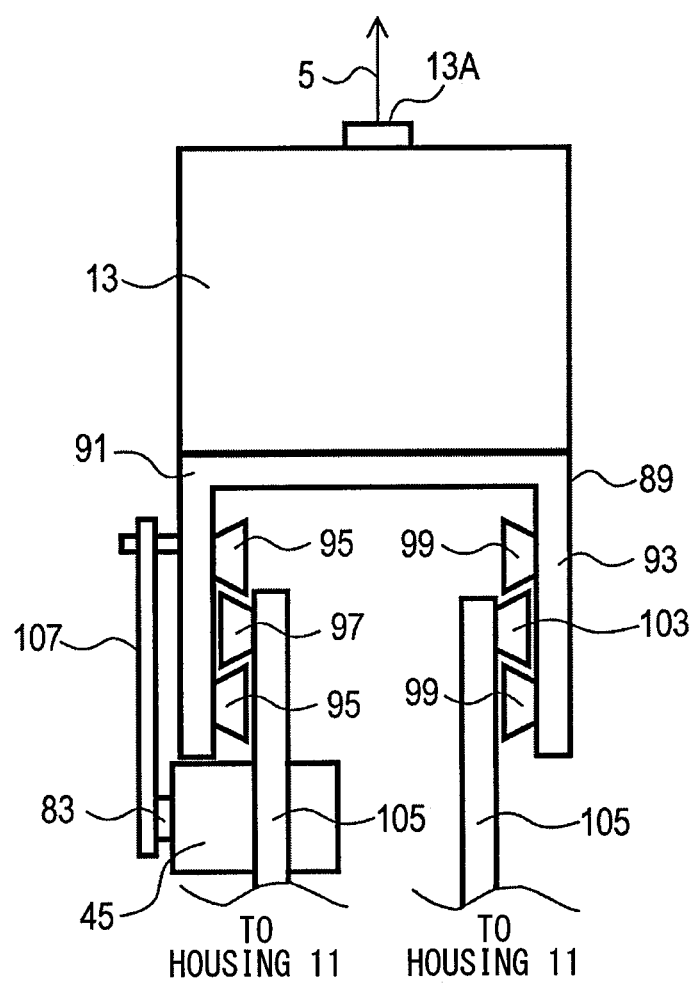
FIG. 13B is a front view showing the configuration to move the projection unit.

A configuration of a head-up display device 601 will be described according to FIG. 12, FIG. 13A, and FIG. 13B. As is shown in FIG. 12, the configuration of the head-up display device 601 is basically same as the configuration of the head-up display device 1 of the first embodiment. The following will mainly describe a difference from the first embodiment.

In the present embodiment, the head-up display device 601 does not include a reflecting mirror 21, and light 5 projected from a projection unit 13 directly goes incident on a screen 19. The projection unit 13 is movable and an incident angle of the light 5 that goes incident on the screen 19 varies with a movement of the projection unit 13. The projection unit 13 is movable in an arc orbit about the screen 19.

A configuration to move the projection unit 13 as above will now be described according to FIG. 13A and FIG. 13B. The projection unit 13 is attached to a bracket 89. An opening 13A (a window from which the light 5 is projected) of the projection unit 13 is on an opposite side to the bracket 89. The bracket 89 includes two leg portions 91 on one side in a width direction of a vehicle (corresponding to a direction perpendicular to a sheet surface of FIG. 13A, and a right-left direction of FIG. 13B) and two leg portions 93 on the other opposite side. The leg portions 91 and 93 are provided to a lower part of the bracket 89. The two leg portions 91 are arranged in a front-rear direction of the vehicle. The two leg portions 93 are also arranged in the front-rear direction of the vehicle.

Each of the two leg portions 91 includes a pair of guide rollers 95, and a guide rail 97 is sandwiched by the upper guide roller 95 and the lower guide roller 95. The respective leg portions 91 are thus slidable along the guide rail 97. Likewise, each of the two leg portions 93 includes a pair of guide rollers 99, and a guide rail 103 is sandwiched by the upper guide roller 99 and the lower guide roller 99. The respective leg portions 93 are thus slidable along the guide rail 103.

Each of the guide rails 97 and 103 extends in the front-rear direction of the vehicle, and is disposed at a predetermined interval. Each of the guide rails 97 and 103 is attached to a housing 11 with a support member 105. Each of the guide rails 97 and 103 has an arc shape with a circle center located at the screen 19.

The head-up display device 601 includes a motor 45 as a drive source of the bracket 89. A rotation shaft 83 of the motor 45 is coupled to an upper part of the bracket 89 via a link 107. Hence, when the motor 45 rotates, a drive force allows the bracket 89 and the projection unit 13 to slide along the guide rails 97 and 103. As has been described above, each of the guide rails 97 and 103 has an arc shape with the position of screen 19 as the circle center. Thus, the projection unit 13 can move in an arc orbit about the screen 19.

2. Effect of Head-Up Display Device 601

According to the seventh embodiment describe above in detail, the following effect can be achieved in addition to the effects (1A) through (1C), 1(E), and (1F) achieved in the first embodiment.

(7A) In the present embodiment, the light 5 projected from the projection unit 13 directly goes incident on the screen 19 without reflecting on a reflecting mirror. Hence, a light amount reduction caused by the reflection can be suppressed before the light 5 goes incident on the screen 19.

(Other Embodiments)

While the above has described the embodiments of the present disclosure, it should be appreciated that the present disclosure is not limited to the embodiments above and various other embodiments are also feasible.

Figure 14:
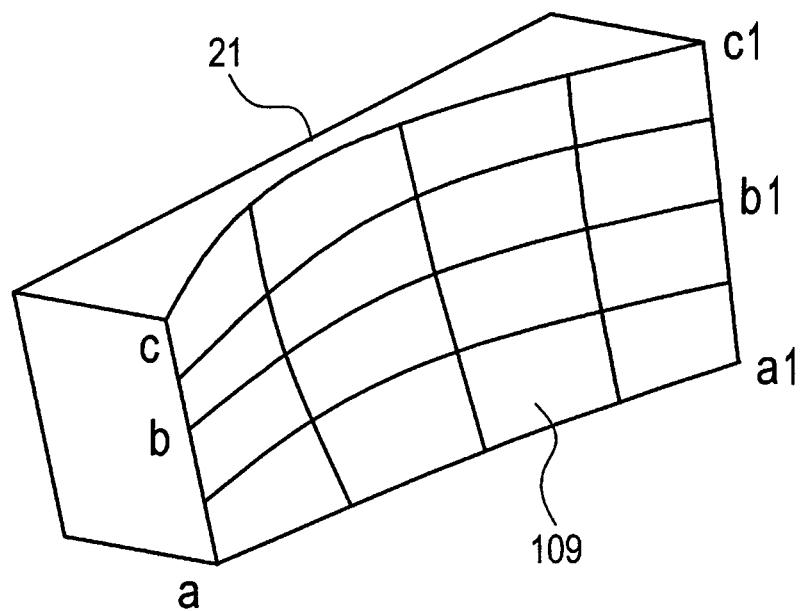
FIG. 14 is a perspective view showing a reflecting mirror of another embodiment.

(1) In the first through seventh embodiments above, the reflecting mirror 21 may be a concave mirror as is shown in FIG. 14. A reflecting surface 109 of the reflecting mirror 21 has an inhomogeneous curvature distribution. In short, a curvature differs from spot to spot across the reflecting surface 109. For example, across the reflecting surface 109 of FIG. 14, a radius of curvature in cross section along a line a-a1 is 400 mm, a radius of curvature in cross section along a line b-b1 is 350 mm, and a radius of curvature in cross section along a line c-c1 is 300 mm. Alternatively, the reflecting mirror 21 may be a convex mirror having an inhomogeneous curvature distribution.

Figure 15:
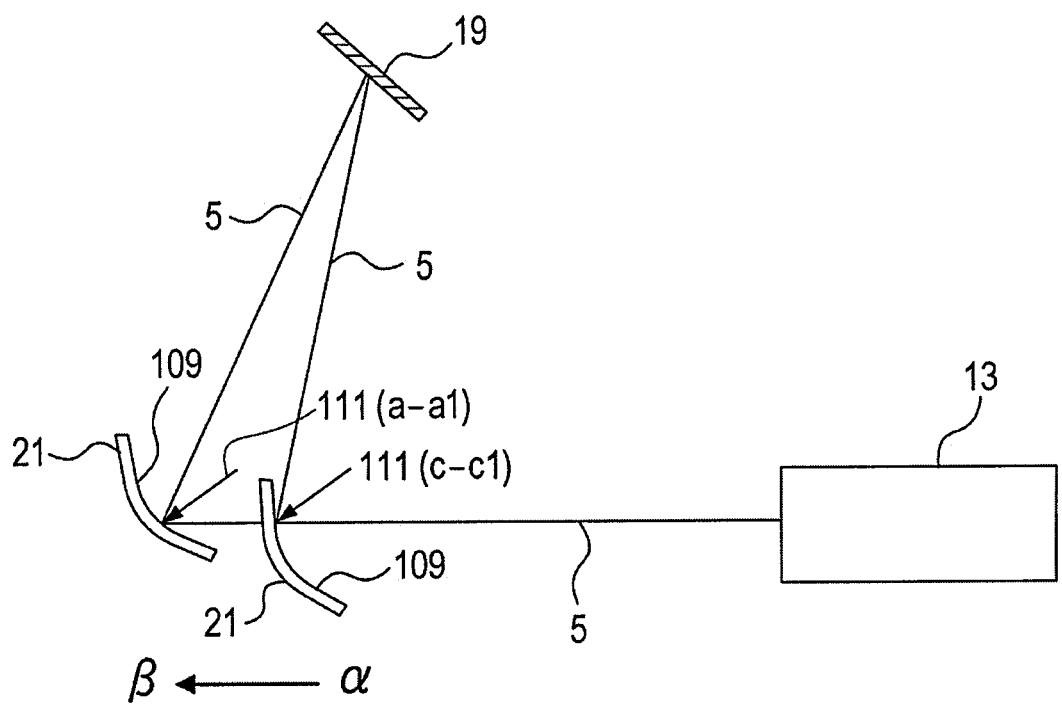
FIG. 15 is a view used to describe a relation of a location of the reflecting mirror and an incident position on the reflecting mirror.

In a case where the reflecting mirror 21 as above is used, as is shown in FIG. 15, an incident position 111 where the light 5 goes incident on the reflecting mirror 21 is displaced according to a location of the reflecting mirror 21. Thus, a curvature of the reflecting surface 109 at the incident position 111 is changed according to the location of the reflecting mirror 21. For example, when the reflecting mirror 21 is located at the position a, the incident position 111 is located on the line c-c1 of the reflecting surface 109. When the reflecting mirror 21 is located at the position 13, the incident position 111 is located on the line a-a1 of the reflecting surface 109.

An image forming position of the light 5, which transmits from the projection unit 13 to the screen 19, remains constant on the screen 19 regardless of the location of the reflecting mirror 21. More specifically, when the reflecting mirror 21 moves, an actual distance from the projection unit 13 to the screen 19 varies and a curvature at the incident position 111 also varies. Because the two variances cancel out each other, the image forming position is maintained constant.

When the reflecting mirror 21 moves, the image forming position is not necessarily maintained perfectly constant. As an example, a movement distance of an image forming position caused by a movement of the reflecting mirror with the reflecting surface 109 having the inhomogeneous curvature distribution may be set to be smaller than a movement distance of an image forming position caused by a movement of a reflecting mirror with a reflecting surface having a homogeneous curvature.

(2) In the first through seventh embodiments above, the projection unit 13 may be of another type. For example, light from a light source may be emitted to a display portion where an image is displayed, and light allowed to pass through or reflected on the display portion may be used as the light 5 representing the image.

(3) In the first through seventh embodiments above, a magnifying optical unit may adopt another optical unit except for the concave mirror 17. For example, more than one set of a concave mirror and a convex mirror may be used as the magnifying optical unit.

(4) In the first through seventh embodiments above, the screen 19 may be a transmissive screen that transmits light. A transmissive screen can be provided by, for example, a micro-lens array.

(5) In the first through seventh embodiments above, the reflecting mirror 21 may be replaced with a prism or a lens.

(6) In the sixth embodiment, a virtual image displayed by one set including the screen 19A and the reflecting mirror 21A and a virtual image displayed by the other set including the screen 19B and the reflecting mirror 21B may be displayed at different positions in the right-left direction.

(7) In the first through seventh embodiments, a length of light path from the projection unit 13 to the screen 19 varies when the reflecting mirror 21 moves. In order to restrict an influence of a variance in the length of this light path, besides the method described in (1) above, the projection unit 13 may be moved to keep a length of light path of the light 5 be equal to a length of light path in which the light 5 forms an image on the screen 19. Alternatively, blurring and distortion caused by a variance in length of light path may be reduced by combining a movement of the projection unit 13 and the method described in (1) above.

(8) A function furnished to a single component in the embodiments above may be allocated to more than one component or functions furnished to two or more components may be allocated to a single component. At least a part of the configurations of the embodiments above may be replaced with a known configuration furnished with a same function. A part of the configurations of the embodiments above may be omitted.

At least a part of the configurations of the embodiments above may be added to or replaced with the configurations of the other embodiments. For example, the second reflecting mirror 87 of the fifth embodiment may be provided to the sixth embodiment. In such a case, the light 5 projected from the projection unit 13 can be led to either the reflecting mirror 21A or the reflecting mirror 21B by reflecting the light 5 on the second reflecting mirror 87.

It should be appreciated that any form included in a technical idea defined solely by the language in claims appended below is an embodiment of the present disclosure.

(9) Besides the head-up display device described above, the present disclosure is implementable in various forms, including a system having the head-up display device as a component, a program causing a computer to function as a controller of the head-up display device, a medium recording the program, a method of displaying a virtual image, and so on.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

What is claimed is:

1. A head-up display device comprising:
a housing;
a projection unit projecting light representing an image; and
an optical unit leading the light projected from the projection unit to a windshield of a vehicle, wherein
the optical unit includes:
  a magnifying optical unit attached to the housing and reflecting the light toward the windshield;
  a screen attached to the housing and reflecting or transmitting the light toward the magnifying optical unit; and
  an incident angle changing unit changing an incident angle of the light that goes incident on a same position on the screen to change an angle of the light that is reflected or transmitted by the screen,
a position of the incident angle changing unit is changeable with respect to the screen, and
the incident angle changing unit is provided by one of a reflecting mirror, a prism, or a lens each of which leads the light to the screen.

2. The head-up display device according to claim 1, further comprising:
a location acquisition unit acquiring a location of the incident angle changing unit; and a correction unit correcting a distortion of the image according to the location of the incident angle changing unit, the image being represented by the light projected from the projection unit.

3. The head-up display device according to claim 1, wherein:
the incident angle changing unit is provided by a reflecting mirror reflecting the light to the screen; and
the reflecting mirror is movable parallel to the light that goes incident on the reflecting mirror.

4. The head-up display device according to claim 1, wherein:
the incident angle changing unit is provided by a reflecting mirror reflecting the light to the screen; and
the reflecting mirror is movable in an arc orbit with a point away from the reflecting mirror as a circle center.

5. The head-up display device according to claim 1, wherein:
the incident angle changing unit is provided by a reflecting mirror reflecting the light to the screen; and
the reflecting mirror is movable in an elliptical orbit which maintains a constant length of a light path of the light from the projection unit to the screen with foci at the projection unit and the screen.

6. The head-up display device according to claim 3, wherein
the reflecting mirror has a finite focal length.

7. The head-up display device according to claim 6, wherein:
the reflecting mirror includes a reflecting surface having an inhomogeneous curvature distribution;
a curvature of the reflecting surface at an incident position where the light goes incident on the reflecting mirror changes with a movement of the reflecting mirror; and
the curvature of the reflecting surface is set so that an image forming position of the light transmitted from the projection unit to the screen remains almost constant on the screen regardless of the movement of the reflecting mirror.

8. The head-up display device according to claim 1, further comprising
a reflection unit reflecting the light projected from the projection unit to the incident angle changing unit.

9. The head-up display device according to claim 1, wherein
the screen is provided by a reflective screen.

10. The head-up display device according to claim 1, wherein:
the optical unit includes two or more optical sets;
each of the optical sets individually includes the screen and the incident angle changing unit; and
a direction leading the light to the windshield in one of the two or more optical sets is different from another one of the two or more optical sets.

11. A head-up display device comprising:
a housing;
a projection unit projecting light representing an image; and
an optical unit leading the light projected from the projection unit to a windshield of a vehicle, wherein
the optical unit includes:
a magnifying optical unit attached to the housing and reflecting the light toward the windshield;
a screen attached to the housing and reflecting or transmitting the light toward the magnifying optical unit; and
an incident angle changing unit changing an incident angle of the light that goes incident on the screen to change an angle of the light that is reflected or transmitted by the screen,
a position of the incident angle changing unit is changeable with respect to the screen,
the incident angle changing unit is provided by a reflecting mirror reflecting the light to the screen, and
the reflecting mirror is movable in an elliptical orbit which maintains a constant length of a light path of the light from the projection unit to the screen with foci at the projection unit and the screen.

12. The head-up display device according to claim 1, wherein
the incident angle changing unit is provided by the reflecting mirror reflecting the light from the projection unit to the screen,
the reflecting mirror is movable between a first position and a second position with respect to the projection unit,
the first position is closer to the projection unit than the second position,
when the reflecting mirror is at the first position, the incident angle of the light that goes incident on the same position on the screen is a first incident angle,
when the reflecting mirror is at the second position, the incident angle of the light that goes incident on the same position on the screen is a second incident angle, and
the second incident angle is smaller than the first incident angle.

\* \* \* \* \*